(12) United States Patent
Kerner

(10) Patent No.: US 6,333,614 B1
(45) Date of Patent: Dec. 25, 2001

(54) METHOD AND CIRCUIT FOR MONITORING THE OPERATING CONDITION OF ELECTRIC MOTORS

(75) Inventor: Norbert Kerner, Traunwalchen (DE)

(73) Assignee: Johannas Heidenhain GmbH, Trauncut (DE)

(*) Notice: Subject to any disclaimer, the term of this patent is extended or adjusted under 35 U.S.C. 154(b) by 0 days.

(21) Appl. No.: 09/529,712

(22) PCT Filed: Oct. 9, 1998

(86) PCT No.: PCT/EP98/06423
 § 371 Date: Jul. 24, 2000
 § 102(e) Date: Jul. 24, 2000

(87) PCT Pub. No.: WO99/19781
 PCT Pub. Date: Apr. 22, 1999

(30) Foreign Application Priority Data

Oct. 15, 1997 (DE) .............................. 197 45 490

(51) Int. Cl.⁷ .................................... G05B 19/28
(52) U.S. Cl. .......................... 318/602; 318/603; 318/687
(58) Field of Search .................. 318/65.3, 65.5, 318/65.8, 135, 432, 434, 727, 767, 768, 792–811, 310, 311, 314, 318, 328, 329, 600–603, 119, 282, 687; 388/909, 911, 912

(56) References Cited

U.S. PATENT DOCUMENTS

| 3,794,899 | * | 2/1974 | Breslow | 318/602 |
| 4,463,300 | * | 7/1984 | Mayne et al. | 318/603 |
| 4,594,538 | | 6/1986 | Schmitt . | |
| 5,689,170 | * | 11/1997 | Ishikawa | 318/811 |

FOREIGN PATENT DOCUMENTS

| 42 24 620 | 3/1964 | (DE) . |
| 40 16 836 | 11/1991 | (DE) . |
| 195 22 447 | 1/1997 | (DE) . |
| 0 247 994A2 | 12/1987 | (EP) . |
| 0 247 994A3 | 11/1988 | (EP) . |
| 0 443 384 | 8/1991 | (EP) . |
| 0 450 834 | 10/1991 | (EP) . |
| 0 658 832A2 | 6/1995 | (EP) . |
| 0 658 832A3 | 5/1998 | (EP) . |
| 2 063 595 | 6/1981 | (GB) . |

OTHER PUBLICATIONS

"Controleur de rotation minimale" Tout L'Electronique, No. 406, Jan., 1976, p. 65.

D. Dietrich et al., "Prozesssicherheit mit parallelen Systemen," Elektronik, vol. 66, No. 5, Mar. 19, 1984, pp. 20–22 and 25.

* cited by examiner

*Primary Examiner*—Khanh Dang
(74) *Attorney, Agent, or Firm*—Brinks Hofer Gilson & Lione

(57) ABSTRACT

A circuit arrangement for monitoring the operational state of an electric motor that includes an angle encoder mechanically connected with an electric motor. A first processor electrically connected to the angle encoder, wherein the first processor includes a first comparator that receives an output signal from the angle encoder. A second processor electrically connected to the angle encoder, wherein the second processor includes a second comparator that receives the output signal from the angle encoder. A shutoff component connected to the first and second processors to receive output signals from the first comparator and the second comparator, wherein the shutoff component shuts off the electric motor should an error be detected in either one of the output signals of the first and second comparators during a testing interval.

26 Claims, 2 Drawing Sheets

METHOD AND CIRCUIT FOR MONITORING THE OPERATING CONDITION OF ELECTRIC MOTORS

Applicant claims, under 35 U.S.C. §119, the benefit of priority of the filing date of Oct. 15, 1997 of a German patent application, copy attached, Serial Number 197 45 490.9, filed on the aforementioned date, the entire contents of which is incorporated herein by reference.

BACKGROUND OF THE INVENTION

1. Field of the Invention

The invention relates to a method for monitoring the operational state of electric motors, and a circuit arrangement for executing the method.

2. Description of the Related Art

It is known that safety functions are increasingly provided for the most varied types of machine tools and processing centers, which as a rule assures a limited operation, a safe stop or safe operating stop of the respective machines even if one or several components fail, or in case of wrong operation. By means of this it is intended to dependably prevent accidents in which the workpiece, the tool or the machine could be damaged or the user could even be injured. To avoid expensive additional arrangements, these safety functions are integrated into the control unit of the machine.

So that the control unit of the machine can dependably detect at what time it is necessary to perform a safety function, the functions and parameters relevant for safety are also positively monitored. To this end, it is necessary that two independent processors perform the monitoring actions simultaneously.

It is disadvantageous here that up to now only the safe processing and the safe forwarding of the signals received from an electric motor or transmitted to an electric motor were monitored. If operational states should occur inside the electric motor itself which might lead to an unsafe operational state of the entire machine, this cannot be detected by the control unit, since in this case there is no erroneous processing or transmission.

SUMMARY OF THE INVENTION

An object and advantage of the present invention therefore is to disclose a method and a circuit arrangement, by means of which a control unit of a machine tool or of a robotic device can assuredly detect whether the electric motors regulated by the control unit are in a safe operating state.

This object and advantage is attained by a first aspect of the present invention that regards a method for monitoring the operational state of an electric motor that includes changing a torque current of an electric motor and performing a first evaluation of an output signal of an angle encoder during a testing interval, wherein the angle encoder is connected to the electric motor, and the output signal is representative of the number of revolutions of the angle encoder. Simultaneously and independently performing a second evaluation of the output signal a second time during the testing interval. Determining first and second changes in number of revolutions of the angle encoder during the testing interval based on the first and second evaluations, respectively. Detecting a safe operational state for the electric motor if the magnitude of each of the first and second changes in number of revolutions lies above a minimum value and performing steps for producing a safe operational state for the electric motor if either of the first and second changes in number of revolutions lies below a predetermined value.

A second aspect of present invention that attains the object and advantage regards a circuit arrangement for monitoring the operational state of an electric motor that includes an angle encoder mechanically connected with an electric motor. A first processor electrically connected to the angle encoder, wherein the first processor includes a first comparator that receives an output signal from the angle encoder. A second processor electrically connected to the angle encoder, wherein the second processor includes a second comparator that receives the output signal from the angle encoder. A shutoff component connected to the first and second processors to receive output signals from the first comparator and the second comparator, wherein the shutoff component shuts off the electric motor should an error be detected in either one of the output signals of the first and second comparators during a testing interval.

The method and circuit arrangement in accordance with the invention has the advantage that, in addition to monitoring the transmission and detection of the control signal, the output signal of the angle encoder of the electric motor is also monitored. Because of this, no danger can arise for the user or the machine, even if a malfunction occurs in an angle encoder or an electric motor which, for example, causes a stoppage of the electric motor or prevents the evaluation of the output signal from the angle encoder.

The present invention will be explained in greater detail in what follows by means of the embodiments represented in the drawings. Shown are in:

DESCRIPTION OF THE PREFERRED EMBODIMENT(S)

Figure 1:
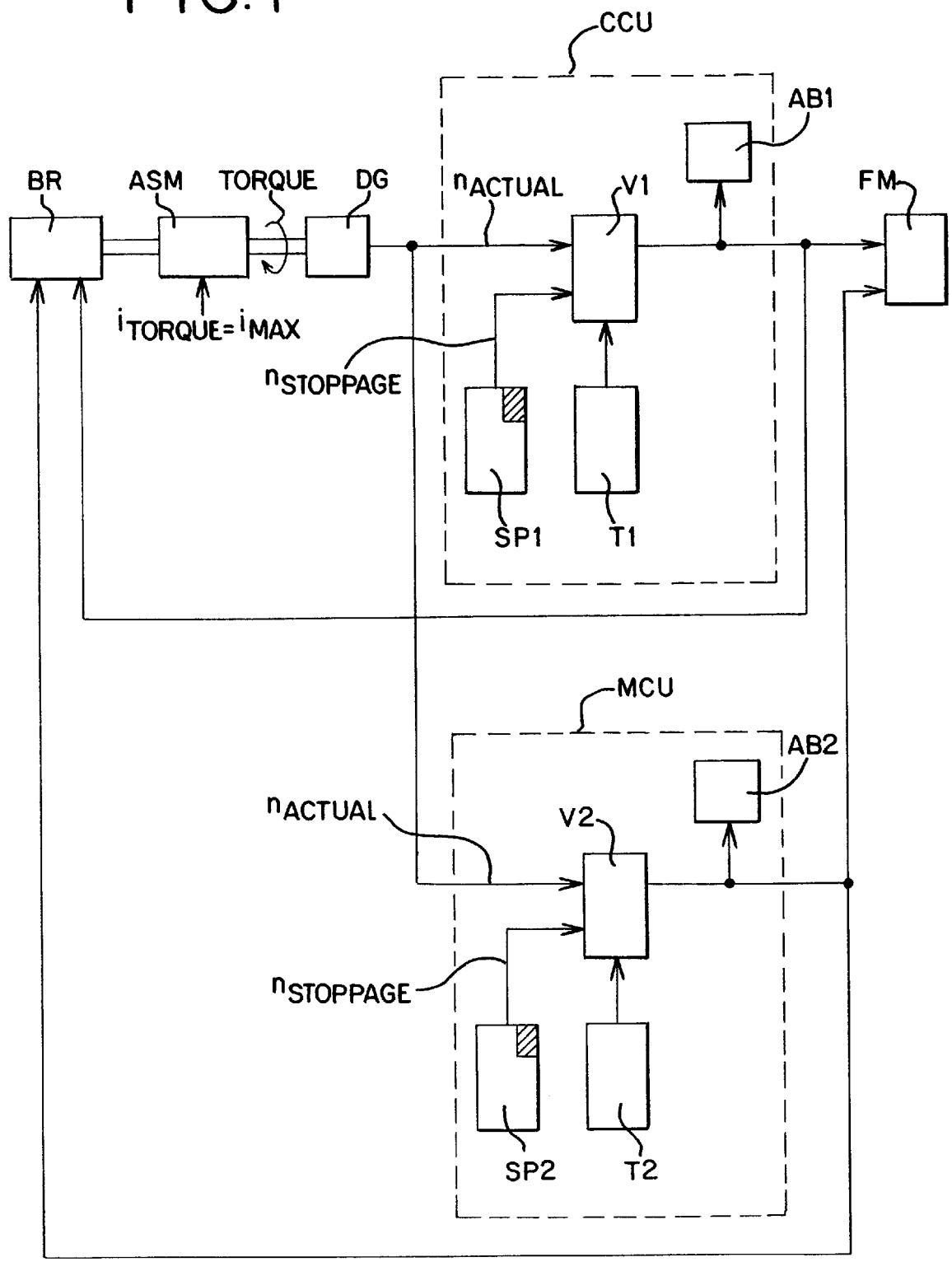
FIG. 1 schematically shows a possible embodiment of a monitoring circuit arrangement in accordance with the present invention.

Only the components of a machine tool in accordance with the invention which are relevant for the invention are represented in FIG. 1. For the sake of simplicity, what follows is based on only one electric motor ASM, however, monitoring in accordance with the invention is provided for all shaft motors and for the spindle motor of any arbitrary machine tool. Monitoring the stoppage takes place in connection with asynchronous motors ASM in particular, since a permanent and uncontrolled motion can take place with this type of motor in particular, even if the angle encoder signal should fail.

A two-channel structure for monitoring the stoppage of an electric motor ASM is shown in detail in FIG. 1. In this case, the two channels have been realized completely independently of each other. Monitoring of a stoppage preferably takes place when the first processor CCU issues the torque current $i_{torque}$ which is maximally permissible for the electric motor ASM, as the set value $i_{max}$. The torque current causes a proportional torque in the electric motor ASM. The sum of the torque current and magnetizing current, which leads to power loss, results in the total of the motor current supplied to the electric motor ASM. Monitoring can take place simultaneously with other functions, which are not affected by this monitoring, so that the user does not notice the monitoring and it also does not require a special outlay of time.

In general, the operational state of an electric motor ASM can always be detected when the torque current is increased, so that the number of revolutions must also increase proportionally with the torque current. Note that the term "number of revolutions" as used in the description and the claims is equivalent to "rotation speed." In the following exemplary embodiment, it is assumed that the electric motor ASM is started by the maximally permissible torque current at a zero number of revolutions.

As soon as the number of revolutions of the electric motor ASM is zero, and the highest possible set value $i_{torquemax}$ for the torque current $i_{torque}$ is output to the control circuit of the electric motor ASM by a first processor CCU in the first channel, the monitoring of the number of revolutions in accordance with the invention takes place. In this case, the actual number of revolutions $n_{actual}$ of the electric motor ASM is determined by an angle encoder DG and is compared with a number of revolutions $n_{stoppage}$ when it is stopped. The number of revolutions $n_{stoppage}$ at stoppage is stored, for example, in the first processor CCU or in a separate memory SP1 and in this way is fixedly preset for an electric motor ASM. The number of revolutions $n_{stoppage}$ at stoppage has a value which is slightly greater than zero, and a stoppage of the electric motor ASM can be assumed to be a fact, for example, at ten revolutions per minute. But if it is determined in the course of a subsequent comparison in the first processor CCU, or in a special comparison component VI, that the actual number of revolutions $n_{actual}$ is greater than the number of revolutions $n_{stoppage}$ at stoppage, there is no malfunction and the electric motor ASM is in a safe operating state.

In case the actual number of revolutions $n_{actual}$ is less than the number of revolutions $n_{stoppage}$ at stoppage, a testing interval is started in a timer T1 by the comparison component V1 or by the first processor CCU, which runs for approximately 200 ms. The timer T1 can be designed as a separate component, or can be integrated in the first processor CCU as well. During the testing interval, a permanent check is made whether the actual number of revolutions $n_{actual}$ continues to remain lower than the number of revolutions $n_{stoppage}$ at stoppage. If this is not the case, i.e. if the actual number of revolutions $n_{actual}$ exceeds the number of revolutions $n_{stoppage}$ at stoppage during the testing interval, no malfunction of the electric motor ASM is detected, i.e. the electric motor ASM is in a safe operational state in this case, too. It is possible here to select the length of the testing interval as a function of the torque current and the moment of inertia of the electric motor ASM.

If during the entire testing interval the actual number of revolutions $n_{actual}$ remains less than the number of revolutions $n_{stoppage}$ at stoppage, an error is detected by the first processor CCU. The entire motor current is then switched off by a switchoff component AB1 of the first processor CCU to prevent damage, the respective shaft is mechanically braked by the brake BR, and an error message is issued to the user by an error message component FM. In this case, the detected error could have been caused by a malfunction in the determination of the number of revolutions of the electric motor ASM, a short circuit in the electric motor ASM, an error in the frequency converter or the power amplifier, or by other causes.

Figure 2:
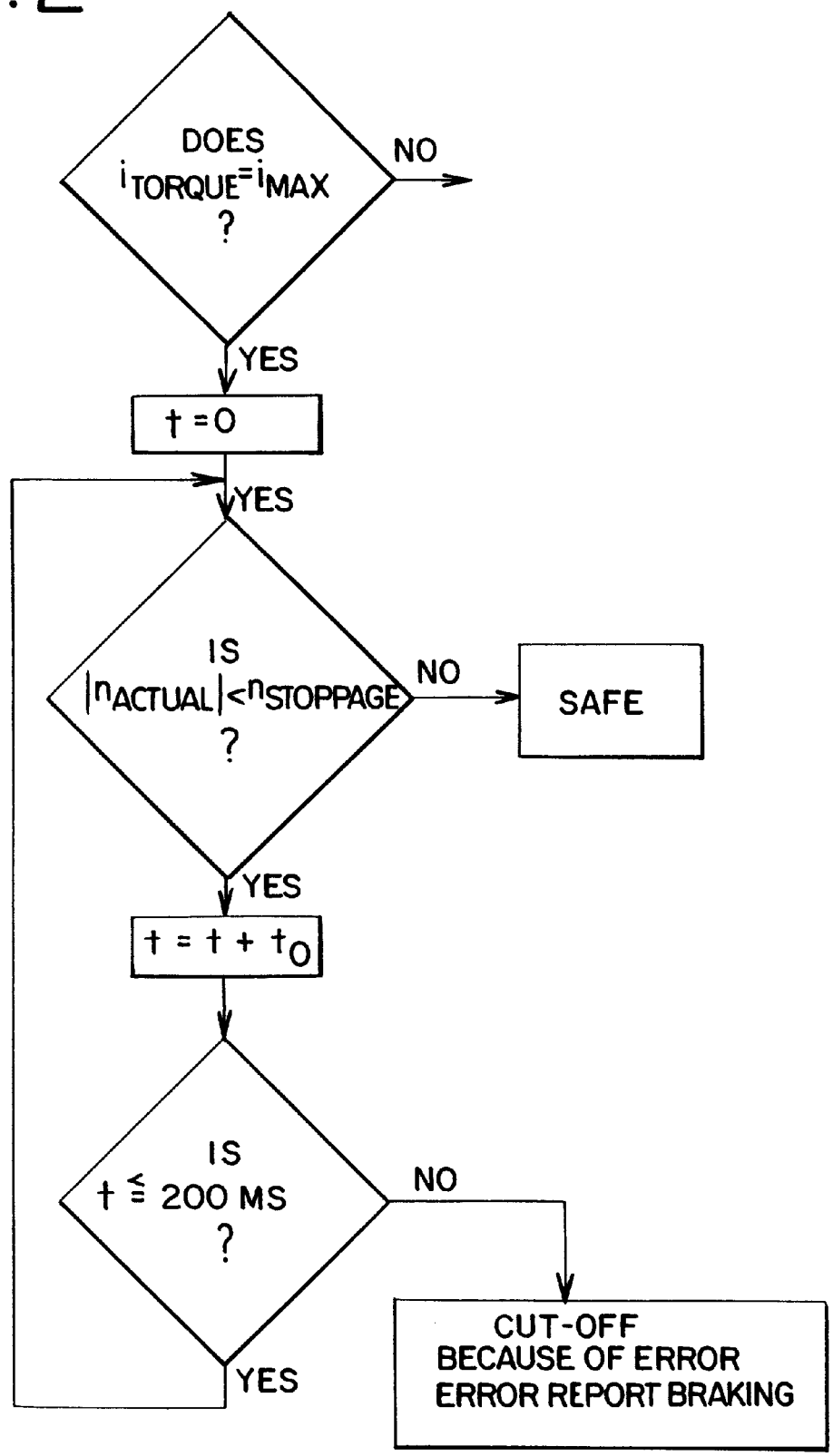
FIG. 2 shows a program flow chart of an embodiment of the method in accordance with the present invention.

A flow chart of the method is represented in FIG. 2. A check is made in a first step whether the amount of the actual number of revolutions $n_{actual}$ is less than the number of revolutions $n_{stoppage}$ at stoppage. Based on the magnitude or absolute value of the actual number of revolutions in the course of the comparison, both possible directions of rotation of an electric motor ASM can be taken into consideration. If the amount of the actual revolutions $n_{actual}$ is greater than the number of revolutions $n_{stoppage}$ at stoppage, it is detected that the electric motor ASM is starting and therefore a safe operational state is present. If the amount of the actual number of revolutions $n_{actual}$ is less than the number of revolutions $n_{stoppage}$ at stoppage, the timer T1 is incremented by time $t_0$ and if the timer T1 has not passed the testing interval of 200 ms, for example, then another check is made during the testing interval whether the actual number of revolutions $n_{actual}$ continues to remain less than the number of revolutions $n_{stoppage}$ at stoppage. If this is not the case, a safe operational state is again detected. As shown in FIG. 2, the above process continues until a safe operational state is determined or the testing interval has lapsed, whichever occurs first.

However, if at the end of the testing interval it is determined that the actual number of revolutions $n_{actual}$ is less than the number of revolutions $n_{stoppage}$ at stoppage, the motor current of the electric motor ASM is limited to zero by the first processor CCU, the electric motor ASM is braked by mechanical brakes BR, and an error message is issued to the user.

Although the actual number of revolutions $n_{actual}$ has been determined to be less than the number of revolutions $n_{stoppage}$ at stoppage, it is nevertheless necessary to mechanically brake the shaft determined to be faulty, since there could be a malfunction of the angle encoder DG and the electric motor ASM could actually rotate.

A second channel has been realized, independently of this first channel, by means of circuit technology, which has a second processor MCU, as represented in FIG. 1. The second processor MCU has a connection with the same angle encoder DG with which the first processor CCU is also connected. As explained below, the second processor MCU performs the method illustrated in FIG. 2. By means of the angle decoder the second processor MCU also receives information regarding the actual number of revolutions $n_{actual}$ of the electric motor ASM. However, in order to receive independent information regarding the number of revolutions of the electric motor ASM in spite of this, the output signal of respectively one detection system can be passed on to each processor when employing an angle encoder that contains different detection systems in parallel that determine the number of revolutions described previously. Note that it is also possible to employ two angle encoders in parallel to determine the number of revolutions.

As soon as a maximum torque current is set by the by the first processor CCU while the number of revolutions is zero, a comparison between the number of revolutions $n_{stoppage}$ at stoppage, which is also utilized by the first processor CCU, and the actual number of revolutions $n_{actual}$, which was detected by the angle encoder DG, takes place in the second processor MCU. To this end, the first processor CCU transmits to the second processor MCU at what time a maximum torque current $i_{max}$ had been sent to the electric motor ASM. If the actual number of revolutions $n_{actual}$ of the electric motor ASM detected by the angle encoder DG lies above the number of revolutions $n_{stoppage}$ at stoppage, a safe operational state is detected.

In the other case a timer T2 is started by the comparison device. During the testing interval defined by the timer T2, the second processor MCU continues to check whether the actual number of revolutions $n_{actual}$ continues to be less than the number of revolutions $n_{stoppage}$ at stoppage. If this is not the case, a safe operational state is again detected.

In case where the actual number of revolutions $n_{actual}$ is less than the number of revolutions $n_{stoppage}$ at stoppage even at the end of the testing interval, a malfunction is detected and the current to the electric motor ASM is cut off, an error message is issued to the user, and the electric motor ASM is also braked by means of a mechanical brake BR. Note that in operation, the testing performed in the two channels is performed simultaneously and during the same time interval. In addition, should an error be detected in either channel after the lapse of the testing interval, then an error message is issued to the user.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

What is claimed is:

1. A method for monitoring the operational state of an electric motor, comprising:

changing a torque current of an electric motor;

performing a first evaluation of an output signal of an angle encoder during a testing interval, wherein said angle encoder is connected to said electric motor, wherein said output signal is representative of the number of revolutions of said angle encoder;

simultaneously and independently performing a second evaluation of said output signal a second time during said testing interval;

determining a first change in number of revolutions of said angle encoder during said testing interval based on said first evaluation;

determining a second change in number of revolutions of said angle encoder during said testing interval based on said second evaluation;

detecting a safe operational state for said electric motor if the magnitude of each of said first and second changes in number of revolutions lies above a minimum value; and performing steps for producing a safe operational state for said electric motor if either of said first and second changes in number of revolutions lies below a predetermined value.

2. The method of claim 1, wherein said first evaluation is performed by a first processor and said second evaluation is performed by a second processor.

3. The method of claim 1, wherein said minimum value and said predetermined value are identical.

4. The method of claim 1, wherein said performing steps for producing a safe operational state comprises:

switching off torque current to said electric motor; and braking said electric motor.

5. The method of claim 1, wherein said performing steps for producing a safe operational state is performed at the end of said testing interval.

6. The method of claim 1, wherein said first evaluation comprises:

determining during said first evaluation an actual number, $n_{actual}$, of revolutions of said angle encoder during said testing interval; and comparing the value of $n_{actual}$ determined during said first evaluation with a number of revolutions $n_{stoppage}$ that defines the number of revolutions of said angle encoder during stoppage of said electric motor.

7. The method of claim 6, wherein $n_{stoppage}$ is the minimum value.

8. The method of claim 6, wherein $n_{stoppage}$ is the predetermined value.

9. The method of claim 7, wherein $n_{stoppage}$ is the predetermined value.

10. The method of claim 6, wherein said second evaluation comprises:

determining during said second evaluation an actual number, $n_{actual}$, of revolutions of said angle encoder during said testing interval; and comparing the value of $n_{actual}$ determined during said second evaluation with a number of revolutions $n_{stoppage}$ that defines the number of revolutions of said angle encoder during stoppage of said electric motor.

11. The method of claim 10, wherein $n_{stoppage}$ is the minimum value.

12. The method of claim 10, wherein $n_{stoppage}$ is the predetermined value.

13. The method of claim 11, wherein $n_{stoppage}$ is the predetermined value.

14. A circuit arrangement for monitoring the operational state of an electric motor, comprising:

an angle encoder mechanically connected with an electric motor;

a first processor electrically connected to said angle encoder, wherein said first processor comprises a first comparator that receives an output signal from said angle encoder;

a second processor electrically connected to said angle encoder, wherein said second processor comprises a second comparator that receives said output signal from said angle encoder; and a shutoff component, wherein said shutoff component shuts off said electric motor should an error be detected in output signals from either one of said first and second comparators during a testing interval.

15. The circuit arrangement of claim 14, further comprising:

a timer connected to said first comparator.

16. The circuit arrangement of claim 15, further comprising:

a memory connected to said first comparator.

17. The circuit arrangement of claim 15, further comprising:

a second timer connected to said second comparator.

18. The circuit arrangement of claim 17, further comprising:

a memory connected to said second comparator.

19. The circuit arrangement of claim 16, further comprising:

a second timer connected to said second comparator.

20. The circuit arrangement of claim 19, further comprising:

a second memory connected to said second comparator.

21. The circuit arrangement of claim 14, further comprising:

a mechanical brake connected to said electric motor and said first and second processors, wherein said mechanical brake engages said electric motor should an error be detected in at least one of said output signals of said first and second comparators.

22. The circuit arrangement of claim 14, further comprising an error message component connected to said first and second processors, wherein said error message component is activated should an error be detected in at least one of said output signals of said first and second comparators.

23. The circuit arrangement of claim 21, further comprising an error message component connected to said first and second processors, wherein said error message component is activated should an error be detected in at least one of said output signals of said first and second comparators.

24. A method for monitoring the operational state of an electric motor, comprising:

performing a first evaluation by comparing during a testing interval an actual number of revolutions of an electric motor with a stored number of revolutions which defines the stoppage of said electric motor;

simultaneously and independently performing a second evaluation by comparing during said testing interval the actual number of revolutions of said electric motor with said stored number of revolutions;

detecting a safe operational state for said electric motor if the actual number of revolutions lies above said stored number of revolutions in said first and second evaluations; and performing steps for producing a safe operational state for said electric motor if the actual number of revolutions lies below said stored number of revolutions in at least one of said first and second evaluations.

25. The method of claim 24, further comprising monitoring said electric motor when a torque current of said electric motor is increased from a zero number of revolutions.

26. A circuit arrangement for monitoring the operational state of an electric motor, comprising:

an angle encoder mechanically connected with an electric motor;

a first processor electrically connected to said angle encoder, wherein said first processor comprises a first comparator that receives an output signal from said angle encoder and from a first memory;

a first timer connected to said first comparator to compare said output signal from said angle encoder with an output signal from said first memory at a predetermined time after changing a torque current of said electric motor;

a second processor electrically connected to said angle encoder, wherein said second processor comprises a second comparator that receives said output signal from said angle encoder and from a second memory;

a second timer connected to said second comparator to compare said output signal from said angle encoder with an output signal from said second memory at a predetermined time after changing a torque current of said electric motor; and a shutoff component, which shuts off said electric motor in dependence on an output signal from either one of said first and second comparators.

* * * * *